United States Patent [19]

Collier et al.

[11] 4,322,726

[45] Mar. 30, 1982

[54] APPARATUS FOR PROVIDING A SIMULATED VIEW TO HAND HELD BINOCULARS

[75] Inventors: Albert F. Collier, Westmoreland; David L. Peters, Whitney Point, both of N.Y.

[73] Assignee: The Singer Company, Binghamton, N.Y.

[21] Appl. No.: 105,066

[22] Filed: Dec. 19, 1979

[51] Int. Cl.³ .......................... G09G 1/06; G09B 9/04
[52] U.S. Cl. .................................. 340/705; 340/700; 340/701; 340/720; 434/20; 434/26
[58] Field of Search ............... 340/700, 701, 705, 720, 340/795; 434/20, 26, 69

[56] References Cited

U.S. PATENT DOCUMENTS

| | | | |
|---|---|---|---|
| 3,299,536 | 1/1967 | Sear | 434/26 |
| 4,107,854 | 8/1978 | Bougon | 434/20 |
| 4,189,145 | 2/1980 | Stubben et al. | 434/26 X |

*Primary Examiner*—David L. Trafton
*Attorney, Agent, or Firm*—Jeff Rothenberg; James C. Kesterson; Douglas M. Clarkson

[57] ABSTRACT

A method and apparatus for presenting a scene generated by an electronic visual scene generator to an observer looking through a pair of binoculars 32 is disclosed. The scene presented by the binoculars is an enlarged or magnified portion of a panoramic scene presented on a screen 12 also generated by the visual scene generator 28 and suitable for viewing by the observers unaided eye. In the described embodiment, electronic signals representative of a scene are generated by digital generator 28. These electrical signals are then applied to three small CRT's 72, 74 and 70 each of which has a different color such as red, green and blue where the visual scene is produced by the CRT's three colors. The three CRT's colored images are then combined by means of beam splitters, filters and mirrors 44 to provide a single full colored scene which is then transported to both eye pieces of a pair of hand held binoculars 32 or to the eye piece of a periscope 48 by means of a fiber optic cable 36 and 50 respectively. A panoramic scene on screen 12 and suitable for viewing by the unaided eye and generated by the digital generator 28 is also provided by suitable means such as a CRT projector 14. Thus, by monitoring the orientation of the binoculars 32 a magnified or enlarged view (such as 8X) of a portion of the panoramic view can be provided by the binoculars, for example, according to the orientation. Thus, in accordance with the embodiment described the observer or tank commander can closely inspect by means of the binoculars a selected portion of the panoramic scene as would be the case in a real life situation.

12 Claims, 7 Drawing Figures

APPARATUS FOR PROVIDING A SIMULATED VIEW TO HAND HELD BINOCULARS

TECHNICAL FIELD

This invention relates generally to visual systems for vehicular simulation and more particularly to apparatus and methods for providing scenes which are viewed by apparatus for aiding the eye such as, for example, binoculars or a periscope. The scene viewed through the "eye piece" of such eye aids selectively represents enlarged or magnified portions of a large panoramic scene suitable for viewing by the observer with his unaided eye.

BACKGROUND ART

There are various types of visual systems which are used with modern vehicular simulators and include motion film projection systems, camera model systems, and digital image generation systems. However, experience has shown that the more acceptable systems used today include camera model systems such as described in U.S. Pat. Nos. 2,975,671; 3,643,345; 3,670,426 and 3,961,133. The other acceptable visual system for todays modern simulators is one that produces a computer generated image such as those systems described in U.S. Pat. Nos. 3,621,214; 3,826,864 and 3,961,133. Although both the camera model systems and the computer image generated systems create or generate their visual scenes by entirely different techniques, both of these systems typically use one or more CRT's (Cathode Ray Tube) for presentation of the desired visual scene. In certain of the systems the CRT's are viewed directly, whereas in other systems the CRT's are viewed by means of optics such as beam splitters and/or mirrors. However, for certain types of applications, it has been found that the scene generated on the CRT may better be viewed in certain simulation situations if the scene is projected onto a large panoramic screen surrounding the simulator or the observer. For these purposes, CRT projectors and laser projector displays are particularly useful. Such projected visual scenes have been found particularly useful in those training situations where the observer is not confined to the interior of the vehicle being simulated. For example, with high performance aircraft it will be appreciated that the pilot is confined to the interior of the cockpit. However, if the vehicle being simulated is, for example, a military tank, a locomotive or an automobile it will be appreciated that at times it might be desirable for the operator to stick his head out of the confines of the cockpit for certain observations even when the vehicle is in operation. This is particularly true in the case of a tank commander that may well want to carefully inspect the surrounding terrain to determine potential dangers, targets and/or direction of travel. Thus, in a real life situation the tank commander may open the tank turret or hatch and take a panoramic observation of the surrounding terrain. Furthermore, in such a situation the tank commander may likely want to closely inspect a portion of the terrain located a substantial distance away by means of hand held binoculars.

Since it is desirable that any training situation be able to closely simulate the real life situation, it will be appreciated that in an effective tank training situation, the commander should be able to use his hand held binoculars to closely inspect a "distant" visual scene. However, if in the training situation a tank commander trainee were to use normal binoculars to closely inspect the visual scene generated by means of a CRT projector or laser projector, there would be little or no further resolution available or information provided by such inspection. That is, real binoculars would magnify the panoramic scene, but still not reveal any further detail. Further, the scene would subjectively appear to be degraded with respect to the scene viewed with a naked eye since magnifying an image with a particular resolution does not increase the resolution of that picture. To use his standard binoculars to gain further information from such a projected scene, it would be necessary that the complete projected scene have significantly greater resolution than is necessary for viewing by the unaided eye or that a small high resolution inset be located in the panoramic display at precisely the location at which the commander is viewing. Unfortunately, such a high resolution picture inset would require a seperate projector having an extensive projection lens so that the inset could be moved to any location which the tank commander might wish to view. It will be appreciated, however, that such an approach is very expensive and difficult to provide. In addition, a sophisticated blanking technique to blank out the low resolution panoramic picture at precisely the correct location so that the inset could be projected instead would be necessary. Such apparatus for a blanking system would, of course, also be very expensive.

Therefore, it is an object of the present invention to provide a simple and inexpensive technique for providing to the eye piece of hand held binoculars a selected scene which is an enlarged and magnified portion of a panoramic scene.

It is still another object of this invention to provide a method and apparatus for inspecting a portion of a panoramic scene without having to blank out a portion of the panoramic scene and inset a high resolution scene.

It is yet another object of the present invention to provide a method and apparatus for closely inspecting a portion of a panoramic scene by means of hand held binoculars without having to provide increased resolution of the panoramic scene.

A particular type of visual system for extremely wide angle viewing is disclosed in U.S. Pat. No. 4,048,653. This particular technique is a projection technique which uses the pilot's helmet as part of the lens and projection system. Except for the fact that a portion of the visual system is in close proximity with the observers eyes such as would be the case with a periscope or set of binoculars, there is no similarity between the technique described in this patent and the present invention.

DISCLOSURE OF INVENTION

Other objects and advantages will in part, be obvious and will, in part, appear hereinafter and will be accomplished by the present invention which provides apparatus and methods for providing selected visual scenes to an observer. The apparatus comprises an eye piece such as an eye piece used by hand held binoculars, for viewing a selected visual scene by an observer. As is the case for both binoculars and the periscope, the eye piece is suitable for orientation in a suitable direction. A source means such as, for example, a digital image source means is provided for generating electrical signals representative of the selected scene. The electrical signals provided by the source means are then received and converted by a displayed means, such as for example, a CRT into a visual representation of the selected visual scene. This selected visual scene is then optically transported from the display means to the eye piece at the periscope or hand held binoculars, by suitable optical transporting means such as for example, fiber optics. In a particular embodiment of this invention, three CRT's having three different colors such as red, blue and green receive the electrical signals from the source generating means. The three different colored pictures produced by the three colored CRT's are then combined to provide a full and natural color scene.

BRIEF DESCRIPTION OF DRAWINGS

The above mentioned features of the present invention will be more clearly understood from the consideration of the following description in connection with the accompanying drawings in which.

BEST MODE FOR CARRYING OUT THE INVENTION

Figure 1:
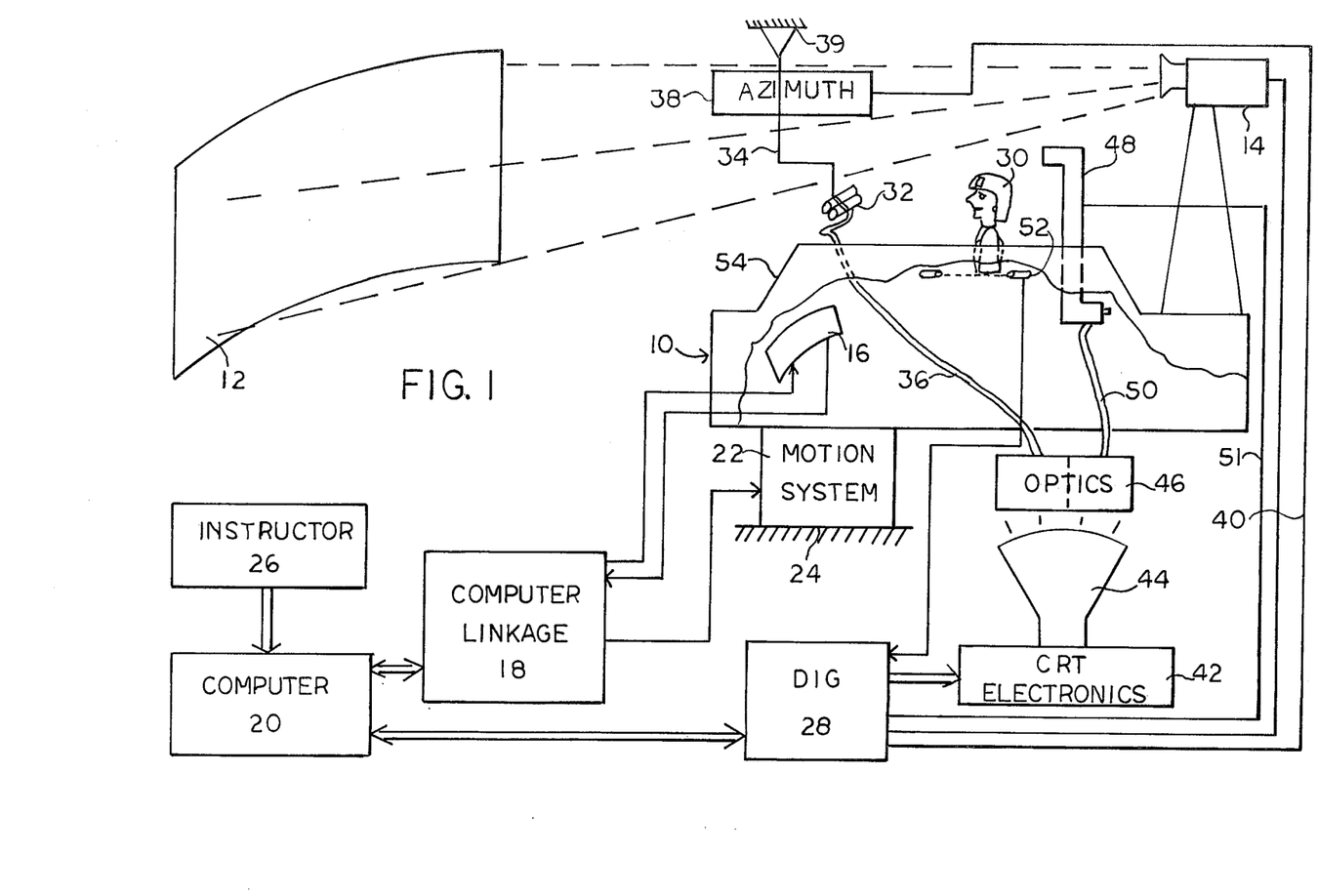
FIG. 1 is a partial pictorial and partial block diagram of the visual system of a tank simulator incorporating the binocular and periscope system of this invention.
Figure 2:
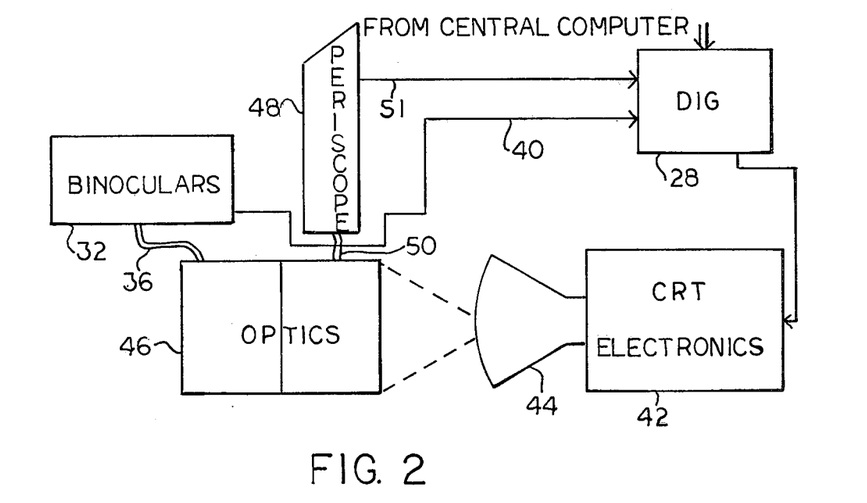
FIG. 2 shows a block diagram of the binocular and periscope visual system of this invention.

Referring now to FIGS. 1 and 2 there is shown a tank simulator 10 having a projection visual system which includes a panoramic screen 12 and a projector 14. It will be appreciated, of course, that screen 12 could be a small curved screen as shown, or could even include a hemispherical dome completely enclosing the tank simulator 10. Similarly, projector 14 could be any type of projection system necessary to project a selected visual scene on the selected screen. In the tank simulator complex as shown, there is included an interior control section which includes instruments and controls generally indicated at 16. The output signals from the tank control section 16 is typically applied to a computer drive linkage 18 which acts as an interface to a computer 20. Also included in the simulator is a motion system 22 shown in block diagram, for varying the position of simulator 10. Motion system 22, is supported at support 24. Also shown is an instructor station 26 which can be used to set up emergency situations, malfunctions, and other desired training conditions. Computer 20 may be any typical computer and will have stored therein some of the necessary motion equations or data applicable to the vehicle being simulated. Thus, as signal representations of the position of the different tank controls as manipulated by an operator are received at computer 20, the computer in accordance with the appropriate motion equations and data continuously determines the simulated motion conditions of the simulated tank. These include, for example, speed, attitude, direction, performance, engine condition, etc. Signals representative of these motion conditions and engine conditions are then applied to instruments in the tank interior to drive the instruments such that they indicate those conditions that the tank being simulated would actually experience if the control movement ocurred in an actual tank vehicle. Thus, the instruments and indicators located in the interior of the simulated tanks provide to the trainee a realistic indication of his direction, terrain roughness, etc. In addition, the computer also provides input signals to drive motion system 22 such that the student also receives motion cues to indicate his attitude and terrain roughness.

The scene projected by projector 14 onto screen 12 may be from any suitable scene generation source. However, of particular suitability to this invention is the use of a digital image generation technique for providing signals which can then be projected. As mentioned heretofore, digital image generation techniques are described in U.S. Pat. Nos. 3,621,214; 3,826,864 and 3,961,133. It will be appreciated that although such digital generation techniques do require the use of a computer, and computing techniques, certain aspects of the digital image generation computer will itself be controlled by the simulator computer 20. Thus, there is shown at 28 a digital image generator for providing the generating means to projector 14.

However, as was discussed before, the attention of tank commander or observer 30 may be attracted to a portion of the panoramic view presented on screen 12 which he might wish to closely inspect. Typically in real life such close inspection would be by the use of hand held binoculars. Thus, there is provided according to this invention hand held binoculars 32 supported by support means 34. Thus, if the tank commander does desire to closely inspect a particular portion of the panoramic scene presented on screen 12 he may take the hand held binoculars 32 and observe that location through binoculars 32. However, as was discussed heretofore it is not feasible to provide such a high resolution visual scene on screen 12 so that standard binoculars could be used to obtain more detailed information. Therefore, according to this invention a magnified view of the particular location which the tank commander wishes to closely inspect is provided through binoculars 32 by means of a fiber optic cable 36. The visual scene provided to binoculars 32 by means of fiber optic cable 36 is generated by digital image generator 28 as was the panoramic view displayed on screen 12, except that the panoramic view had less resolution. To determine which portion of the panoramic view is to be magnified and enlarged and thus presented to the binoculars 32, there is also included apparatus 38 for monitoring the line of sight of the hand held binoculars with respect to the visual system. Orientation apparatus 38 provides to the digital generator by means of line 40 elevation and azimuth signals representative of the position of hand held binoculars 32, from which signals, the digital generator 28 determines the proper magnified view to be generated. An electronic representation of the selected view is then generated by digital generator 28 and provided to the CRT display circuitry 42. The CRT display circuitry 42 includes necessary TV components and circuitry commonly understood by those skilled in the art as well as circuitry for receiving and transferring to the CRT system 44, which may be a CRT as shown, or a complex system as shown and discussed with respect to FIG. 5 hereinafter, the electronic signals generated by digital generator 28. Techniques for applying digital image generated signals to CRT's is provided for in the patents heretofore discussed.

There is shown symbolically at 44 a single CRT which transforms the electronic image from the digital image generator to a visual image on the surface of the CRT. As will be discussed hereinafter, it will be appreciated that CRT system 44 may also include a plurality of CRT's each of which has a different color for combining into a single scene and thereby providing a full color scene through binoculars 32. Optic system 46 then receives a visual scene displayed on CRT system 44, and images this visual scene onto fiber optic cable 36 for transporting to hand held binoculars 32.

However, in addition to the use of hand held binoculars by a tank commander outside the confines of the tank, for safety purposes during battle, it is often desirable for the tank commander to view the terrain by means of a periscope 48 which may have a selection of magnifications. Since the same problem of resolution would occur if the scene presented on screen 12 were viewed by periscope 48 at a selected magnification, it has been discovered that according to this invention the visual scene similar to that provided to hand held binoculars 32 can also be provided on a time sharing basis to periscope 48 by means of another fiber optic cable 50. In a manner similar to that discussed with respect to the hand held binoculars, the direction and orientation of periscope 48 is provided to digital image generator 28 for purposes of selecting the proper magnified scene to be presented to periscope 48. Also, optic system 46 provides the necessary imaging and focusing of the scene displayed on CRT system 44 to fiber optic cable 50. However, it will be appreciated that it is not necessary that the periscope 48 be directed precisely to the same location of the panoramic scene presented on screen 12 as the hand held binoculars 32; nor is it likely to have the same magnification. Thus, it will be appreciated that the scene provided to periscope 48 may well be different than that provided to hand held binoculars 32. However, it will also be appreciated that since the periscope 48 viewed by tank commander 30 and hand held binoculars 32 can only be viewed one at a time, it is not necessary to provide two different CRT display systems and to require visual generator 28 to generate two completely different scenes. Thus, according to the present invention there is also provided a monitoring means 52 at the opening hatch of the tank turret 54 to determine when tank commander 30 has extended his body outside of the tank turret 54. Typically monitoring system 52 may be a light detection system in which the tank commander's body breaks the light signal received at monitor 52 and thus indicates commander 30 has extended his body outside of turret 54. Thus, if the tank commander 30 is outside of the turret then the digital image generation generator 28 provides the proper scene as determined by the orientation of the hand held binocular 32. On the other hand, if the light beam is not broken, monitor 52 provides a signal such that the proper scene as determined by periscope 48 is presented to periscope 48 by fiber optic cable 50. Thus, there has been described at this point an overall discussion of the visual system of this invention.

Figure 3:
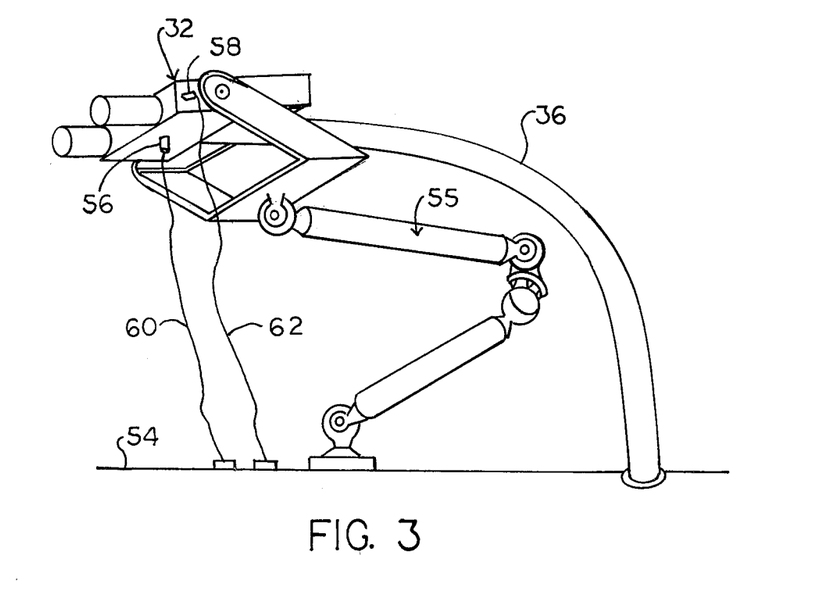
FIG. 3 shows an alternate embodiment for mounting the hand held binoculars of this invention.

Referring now to FIG. 3, there is shown a technique for mounting the binoculars 32 to the top of the tank turret 54 which has been found to be effective and inexpensive. According to this technique, the binoculars may be supported by a swivel support system 55 which gives the tank commander 30 substantial freedom of motion to position the binoculars where he wishes. Connected to the binoculars according to this embodiment, however, are an azimuth direction-sensing means 56 and an elevation direction sensing means 58 for determining the azimuth and elevation of the binoculars. Sensing means 56 and 58 may be of any suitable type including, for example, simply a precise potentiometer which uses as its reference basis a pair of flexible cables 60 and 62 which are referenced to the top of the turret 54. It will be appreciated, of course, that the swivel support system 55 may be mounted to the top of the turret 54 as shown in FIG. 3 or alternately may be suspended above the tank by ceiling 39 or other support means as was shown in FIG. 1.

Figure 4:
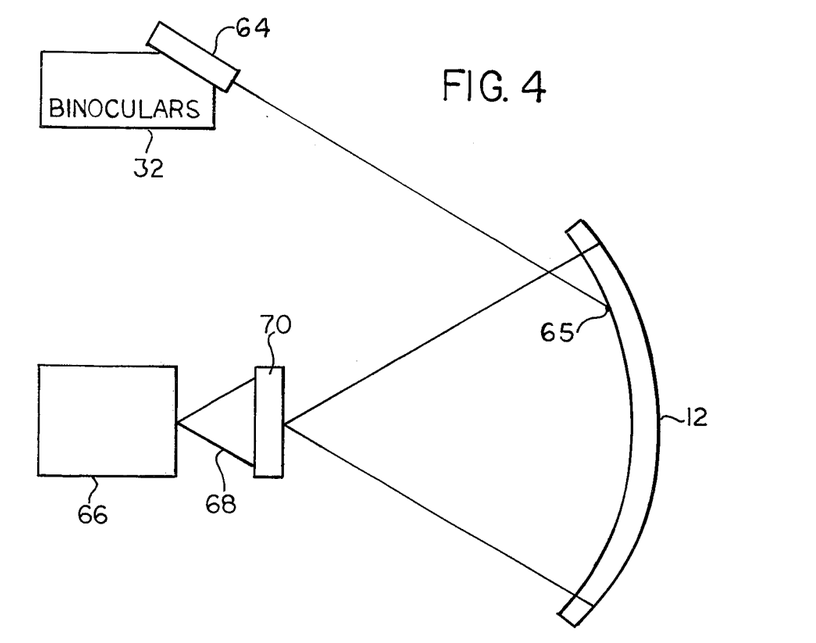
FIG. 4 shows alternate techniques for determining which portion of the panoramic visual scene is to be presented to the hand held binoculars.

In addition to the simple mechanical technique for determining the reference point for the hand held binoculars 32, it will be appreciated that other and more sophisticated and complex systems could also be devised. For example, as shown in FIG. 4 there is shown a complex laser beam generator which works in combination with a wide angle television camera. Thus, according to this technique a laser source 64 is mounted to the binoculars 32 along the line of sight of the binoculars. As is shown in FIG. 4 the laser beam will form a light dot 65 on screen 12. Thus, as the tank commanders line of sight as viewed through the binoculars changes, the laser will form a dot on the screen representing where the commanders line of sight intersects screen 12. A television camera 66, includes a wide angle lens 68 which can cover the complete field of view of the tank commander. However, wide angle lens 68 also may include an optical pass filter 70 which filters all of the light from screen 12 except for that produced by laser 64. Thus, the video information from television camera 66 can then be processed to determine the exact location of the intersection of the laser beam on screen 12. The precise location of the intersection of the laser beam can readily be accomplished by synchronizing the camera 66 with the raster scan of projector 14 (not shown) comparing the raster scan lines to determine such intersection.

Thus, according to this invention the observer or tank commander 30 (not shown) may view a panoramic scene generated by digital image generator 28 and projected by projector 14. It will also be appreciated that there are many techniques which can be used to determine the line of sight of the commander 30 through the hand held binoculars 32 with respect to screen 12 so that the proper portion of the panoramic scene displayed on screen 12 can be enlarged and presented for view at hand held binoculars 32.

With respect to the discussion of the present invention to this point, the invention has been discussed as though CRT 44 were a single CRT. It will be appreciated that a single full color CRT could be used or alternately the scene presented to the commander could be black and white and a simple black and white CRT could be used for the CRT system at 44. However, a rather inexpensive technique for providing color to the hand held binoculars 32 and periscope 48 has been discovered.

Figure 5:
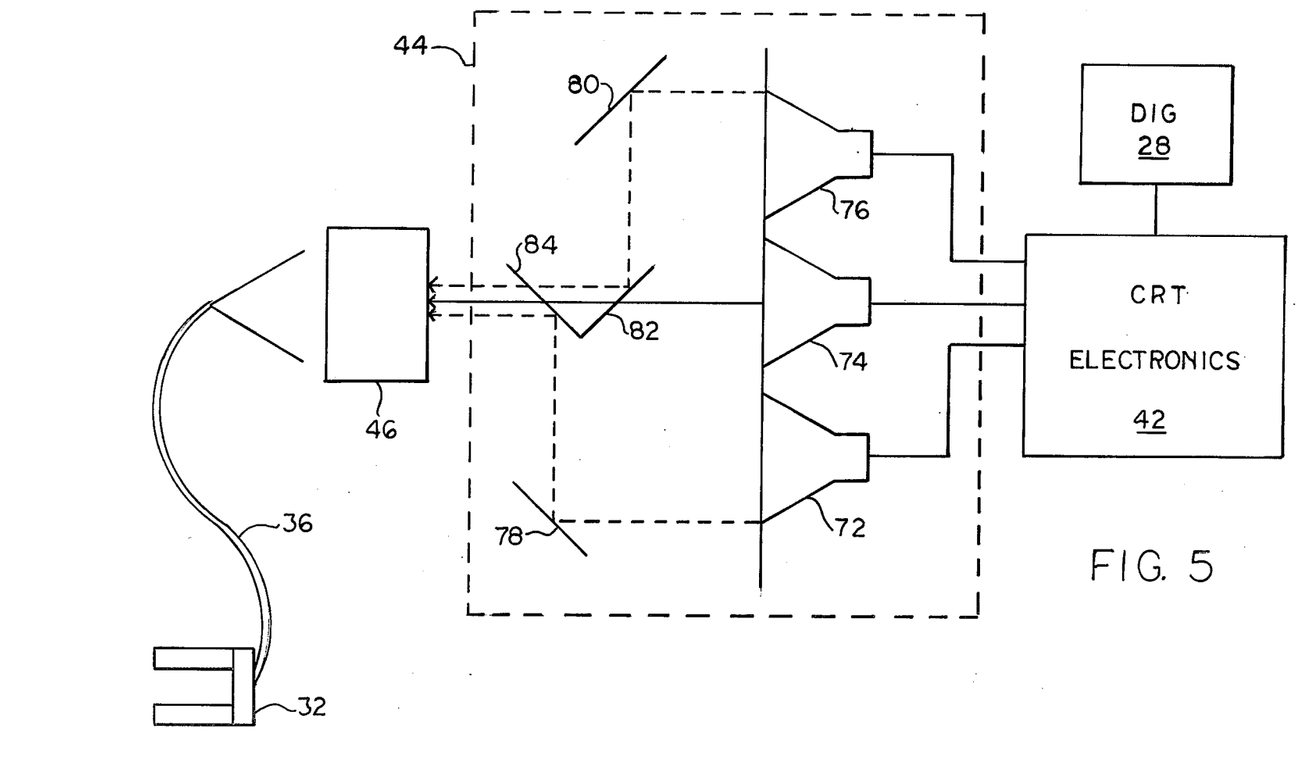
FIG. 5 shows a more detailed block diagram of the use of three CRT's filters and beam splitters for presenting a full colored scene to the hand held binoculars of this invention.

According to this technique, as is shown in FIG. 5, appropriate modulated electronic signals are provided from the CRT electronics 42 to three different CRT's 72, 74 and 76. The three CRT's may suitably be, for example, green CRT 72, red CRT 74 and blue CRT 76. Thus, it will be appreciated that the selected scene will be produced in three different colors, i.e., green, red and blue at CRT 72, 74 and 76 respectively. The outputs of the three CRT's are then combined by a combination of beam splitters, filters and/or mirrors to provide a single full color view at the optic systems 46. For example, the green output CRT 72 is provided to a green reflecting dichroic beam splitter 78 which reflects the green light and passes both red and blue light. Similarly, there is a blue reflecting dichroic element 80 which reflects the blue light and passes green and red light. There is also at 82 a second blue dichroic element. As was the case with the blue reflecting element 80, element 82 reflects blue light and passes both red and green light. Similarly there is a green dichroic element 84 which reflects green light and passes blue and red light. Thus, there is shown an optic system by which the color scene produced by the 72, 74 and 76 can be combined to produce a single full colored scene. For example, the red light from CRT 74 simply passes through the blue element 82 and the green element 84 to the optic system 46. On the other hand, the blue light from CRT 76 is reflected by dichroic blue element 80 to dichroic element 82 and then passes through the green reflecting element 84. Finally, the green image from CRT 72 is reflected from green reflecting element 78 and off of green element 84 to optic system 46.

Figure 6:
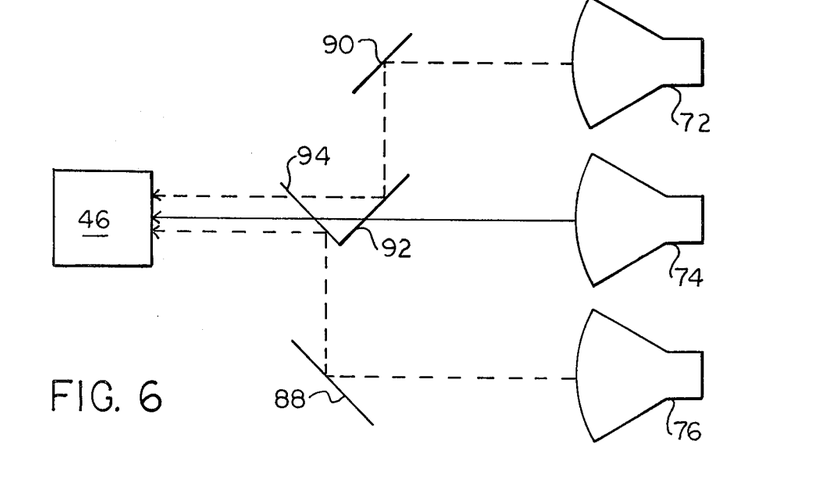
FIG. 6 shows an alternate arrangement for presenting a full colored scene.

Although the combining system of the CRT system 44 just described represents one suitable technique it will be appreciated by those skilled in the art that there are other techniques of combining the three different colored images. For example, referring now to FIG. 6 there is shown a system which simply uses mirrors 88 and 90 along with a green filter 92 and a blue dichroic filter 94. According to this technique in which the various colored CRT's are rearranged from the positions shown in FIG. 5, the red image from red CRT 74 simply passes straight through the green and blue filter 92 and 94 respectively. The green scene from CRT 72 is reflected by mirror 90 and reflected by green dichroic filter 92 and passes through blue dichroic filter 94. The blue scene from CRT 76 is reflected by mirror 88 and off of blue dichroic filter 94 onto optic system 46. Thus, it will be appreciated that several different optic systems and arrangements may be used to combined the three different color scenes from the three CRT's to form a full colored scene.

Figure 7:
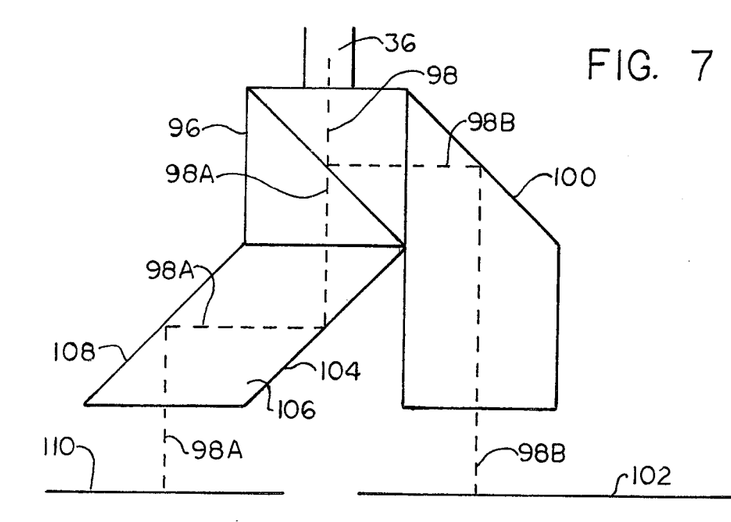
FIG. 7 shows the lens system for receiving the optical scene from the fiber optical cable and splitting the scene into two images for viewing from each of the eye pieces of the hand held binoculars.

Referring to FIG. 7, there is shown the optics necessary for splitting the scene received from the fibre optic cable 36. According to this system, there is shown a beam splitter cube 96 which splits the incoming full colored scene shown at path 98 into two paths 98A and 98B. The path 98B is simply reflected out of beam splitting cube 96 onto prism 100 and onto the binocular objective lense 102. Optic path 98A is reflected from one wall 104 of a rhombic shaped prism to an opposing wall 108 to the second binocular objective lense 110. It will be appreciated, of course, that the splitting capability for the binocular presentation will not be necessary for the single eye piece of the periscope or telescope.

Thus, although the present invention has been described with respect to specific methods and apparatus for providing a selected and enlarged magnified scene to hand held binoculars and periscope, it is not intended that such specific references be considered limitations upon the scope of this invention except insofar as is set forth in the following claims.

We claim:

1. Apparatus for providing selected visual scenes to an observer comprising:
   a first eye piece and a further eye piece for viewing said selected visual scenes by said observer, said first eye piece and said further eye piece being suitable for orienting in a selected direction;
   source means for generating electric signals representative of said selected visual scenes;
   display means for receiving and converting said electrical signals into a visual representation of said selected visual scenes;
   optical transporting means for receiving said visual representation from said display means and transporting said visual representation to said first eye piece and to said further eye piece for viewing by said observer; and
   means for connecting said transporting means and said first eye piece and said further eye piece to provide said selected visual scenes to both said first and further eye pieces.

2. The apparatus of claim 1 wherein said selected visual scene is generated in response to a selected control signal and further comprising means for detecting the orientation of said first eye piece and for providing a first control signal which is representative of said orientation of said first eye piece and suitable for use as said selected control signal.

3. The apparatus of claim 1 wherein said source means comprises means for digitally generating said selected visual scenes.

4. The apparatus of claim 1 wherein said first eye piece and further eye piece are the eye pieces of hand held binoculars.

5. The apparatus of claim 1, 2, 3 or 4 wherein said display means further comprises three CRT's, each of said CRT's producing said visual representation in three different colors and means for combining said three different color visual representations such that said visual representation optically transported to said eye piece represents a full color scene.

6. The apparatus of claim 2 and further comprising;
   another eye piece for viewing said selected visual scene by said observer, said another eye piece also suitable for orientation in a selected direction;
   another optical transporting means for receiving said visual representation from said display means and transporting said visual representation to said another eye piece for viewing by said observer;
   means for determining the orientation of said another eye piece and for providing another control signal representative of said orientation of said another eye piece and suitable for use as said selected control signal;
   means for determining which of said first and another eye piece is being viewed by said observer; and
   means for selecting that one of said first and another control signals for use as said selected control signal corresponding to said eye piece being viewed by said observer.

7. The apparatus of claim 6 wherein said first eye piece comprises a part of hand held simulated binoculars, and said another eye piece comprises a part of a simulated periscope.

8. The apparatus of claim 6 or 7 and further including means for providing a selected panoramic visual scene also generated by said source means and suitable for viewing without the aid of an eye piece, and wherein said selected visual scene is an enlarged portion of said panoramic visual scene.

9. Apparatus for providing selected scenes to an observer comprising:
- first and further eye pieces for viewing said selected scenes by said observer, said first and further eye pieces comprising the eye pieces of hand held binoculars suitable for orientation in a selected direction;
- source means for digitally generating electrical signals represents of said selected scenes, the selection of one of said selected scenes being generated in response to a control signal;
- three CRT means for receiving and converting said electrical signals into a visual representation of said selected scenes, each of said three CRT's producing said selected visual scenes in three different and distinct colors;
- means for combining said three distinctly colored visual scenes from said three CRT's such that a single visual scene representing a full color scene is produced;
- optically transporting means for receiving said full color representation from said three CRT's, and transporting said full color visual representation to said first and further eye pieces of said hand held binoculars for viewing by said observer; and
- means for determining the orientation of said first and further eye pieces of said hand held binoculars and for providing said control signal which is representative of said orientation and binoculars.

10. A method for providing selected visual scenes to an observer comprising the steps of:
- viewing said selected visual scenes through a first eye piece and a further eye piece by orientating said first and further eye pieces in a selected direction;
- digitally generating said visual scenes and providing electrical signals representative of said selected visual scenes;
- receiving and converting said electrical signals into a visual representation of said selected visual scenes for displaying on a display means; and
- optically transporting said visual representation from said display means to said first eye piece and to said further eye piece for viewing by said observer.

11. The method of claim 10 wherein said step of digitally generating is in response to a selected control signal, and further comprising the steps of detecting the orientation of said first and further eye pieces and providing a first selected control signal which is representative of said orientation and which is suitable for use as said selected control signal.

12. The method of claim 10 or 11 wherein said displaying comprises the step of producing said visual representation in three distinct colors on three CRT's and further comprising the step of combining said three distinct color visual representation such that said visual representation optically transported to said eye piece represents a full color scene.

* * * * *